T. BROWN.
DISK COLTER.
APPLICATION FILED APR. 8, 1918.
1,284,871.
Patented Nov. 12, 1918.
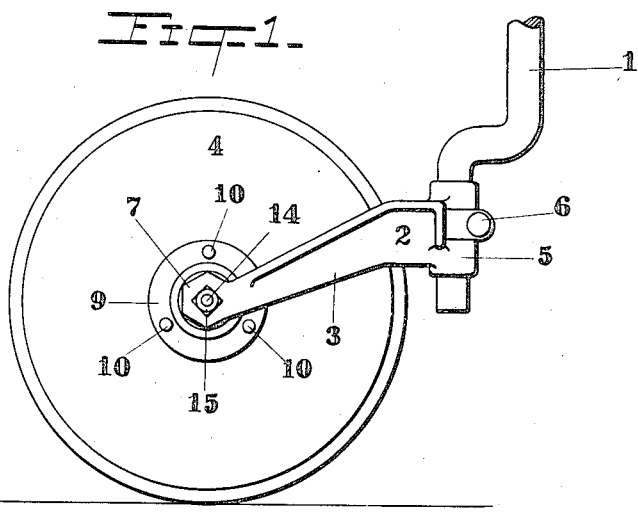
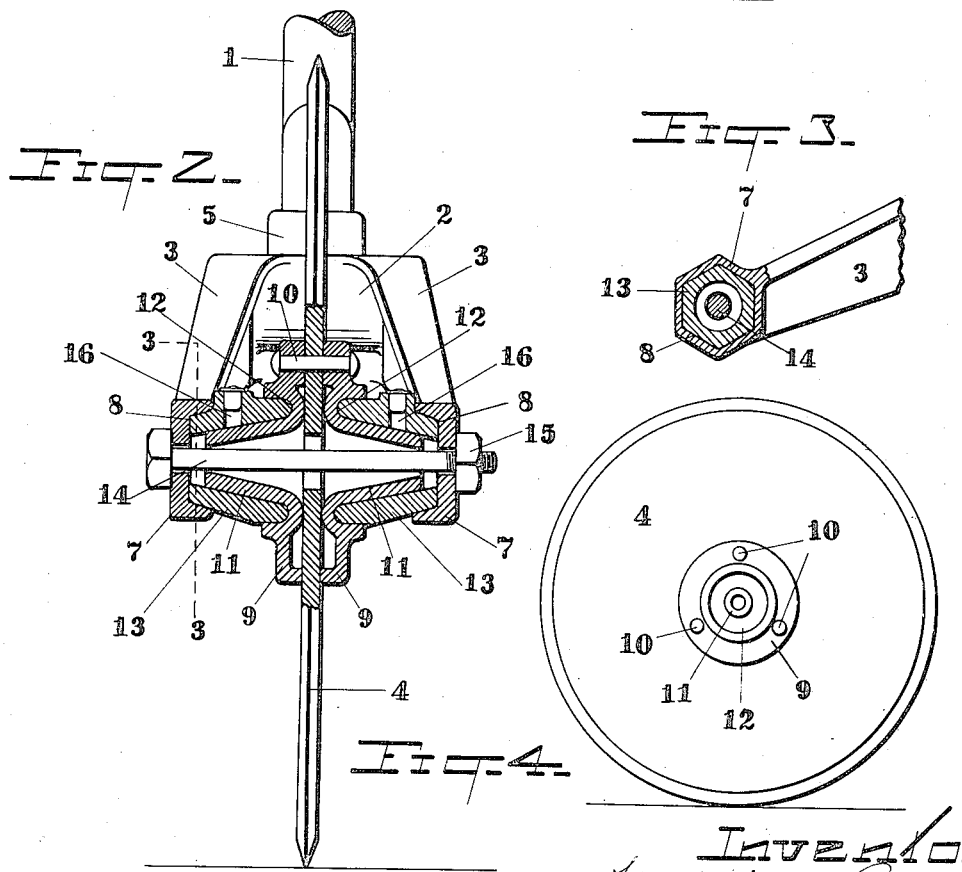

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

DISK COLTER.

1,284,871.

Specification of Letters Patent.   Patented Nov. 12, 1918.

Application filed April 8, 1918. Serial No. 227,290.

*To all whom it may concern:*

Be it known that I, THEOPHILUS BROWN, a citizen of the United States, residing at Moline, in the county of Rock Island and State of Illinois, have invented certain new and useful Improvements in Disk Colters, of which the following is a specification, reference being had therein to the accompanying drawing.

My invention relates to rolling colters, and the object of my invention is to provide a simple and effective bearing which can be readily adjusted to compensate for wear.

Referring to the drawings in which similar numerals indicate identical parts—

Figure 1 is a side elevation of a rolling colter including my invention.

Fig. 2 is a central vertical section of Fig. 1 with the colter broken away.

Fig. 3 is a detail section on the line 3—3 of Fig. 2, of the colter, and

Fig. 4 is a side elevation of the colter.

A standard 1 is of common type and adapted to be secured to a plow beam. Mounted on the support 1 is a fork 2 between the arms 3 of which the colter 4 is mounted; the forward end of the fork is secured to the standard 1, the latter extending through a split bearing 5 such as commonly used and clamped on the standard 1 by a bolt 6.

The arms 3 terminate in enlargements 7 having polygonal sockets 8. The hub of the colter comprises oppositely opposed members 9 between which the colter 4 is secured by rivets 10 passing through the members 9 and the colter. From the center of each of the members 9 is a frusto-conical projection 11, and between these projections and the periphery of the members 9 are circular grooves 12. The projections 11 are journaled to rotate in boxes 13 which are of greater length than the projections 11; the boxes 13 have their inner ends preferably rounded to fit within the grooves 12. The surface of the boxes 12 is polygonal in cross section so that the outer ends thereof are adapted to fit snugly in the sockets 8 of the arms 3. A bolt 14 passes through the assembled parts which are held securely together by a nut 15.

The frusto-conical extensions, forming the hub, and to which the colter is secured, rotate freely in the boxes 13, and are lubricated through suitable apertures 16. The rough use to which a colter is subjected and frequent lateral strain causes the wear thereof in the boxes 13 to be irregular, and adjustment of the parts is necessary to compensate for it, this I obtain by reversing the nut 15 and withdrawing the bolt 14 and then spring the arms 3 apart until the boxes 13 are free from the sockets 8, and are freely turnable upon the frusto-conical projections 11, so that the polygonal surface of the projections 11 will assume a different position in the sockets 8 when the parts are again assembled and secured together by the bolt 14. This adjustment can be readily effected whenever desired and the wear of the parts equalized.

What I claim is—

1. The combination with a disk colter, of a mounting therefor comprising the following elements, a forked support, a hub for the colter, boxes in which said hub is journaled, said boxes having a polygonal outer surface, polygonal sockets in the ends of the fork arms in which the outer ends of said boxes are seated, and a bolt to hold said elements together.

2. The combination with a disk colter, of a mounting therefor comprising the following elements, a forked support, a hub for the colter composed of frusto-conical members extending from opposite sides of the colter and to which the latter is secured, boxes in which said hub is journaled, said boxes having a polygonal outer surface, polygonal sockets in the ends of the fork in which the outer ends of said boxes are seated, and a bolt to hold said elements together.

THEOPHILUS BROWN.